Patented May 4, 1937

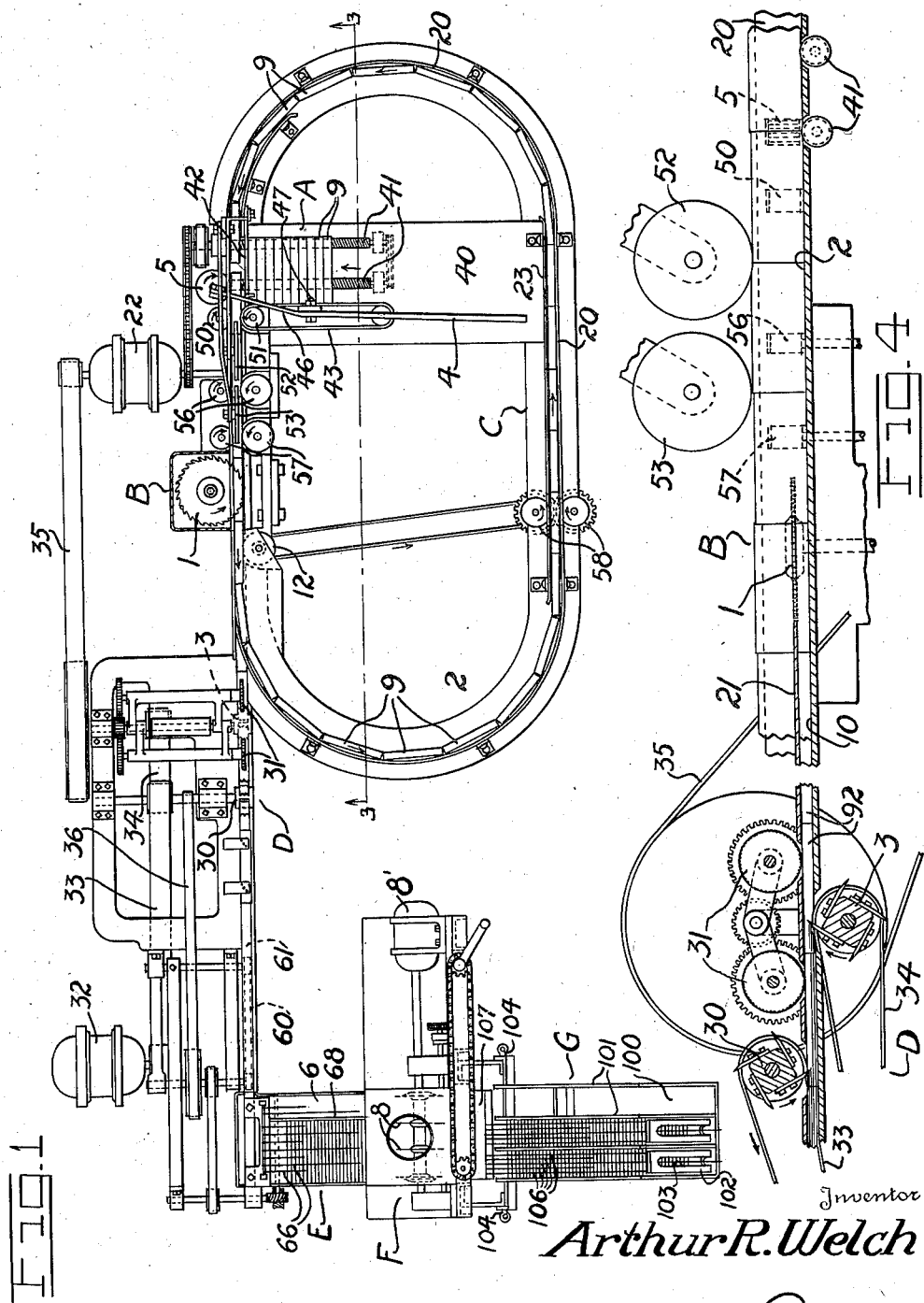

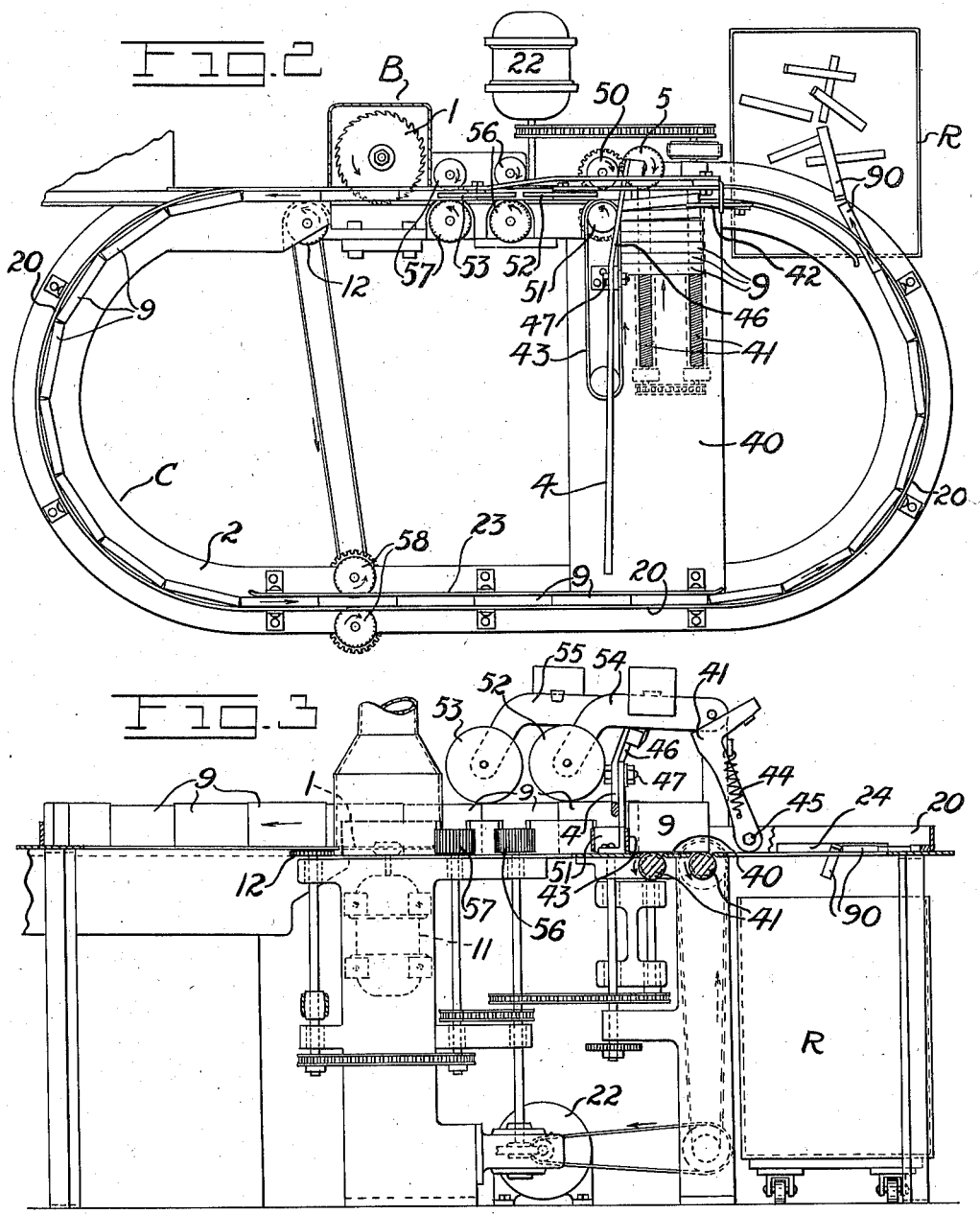

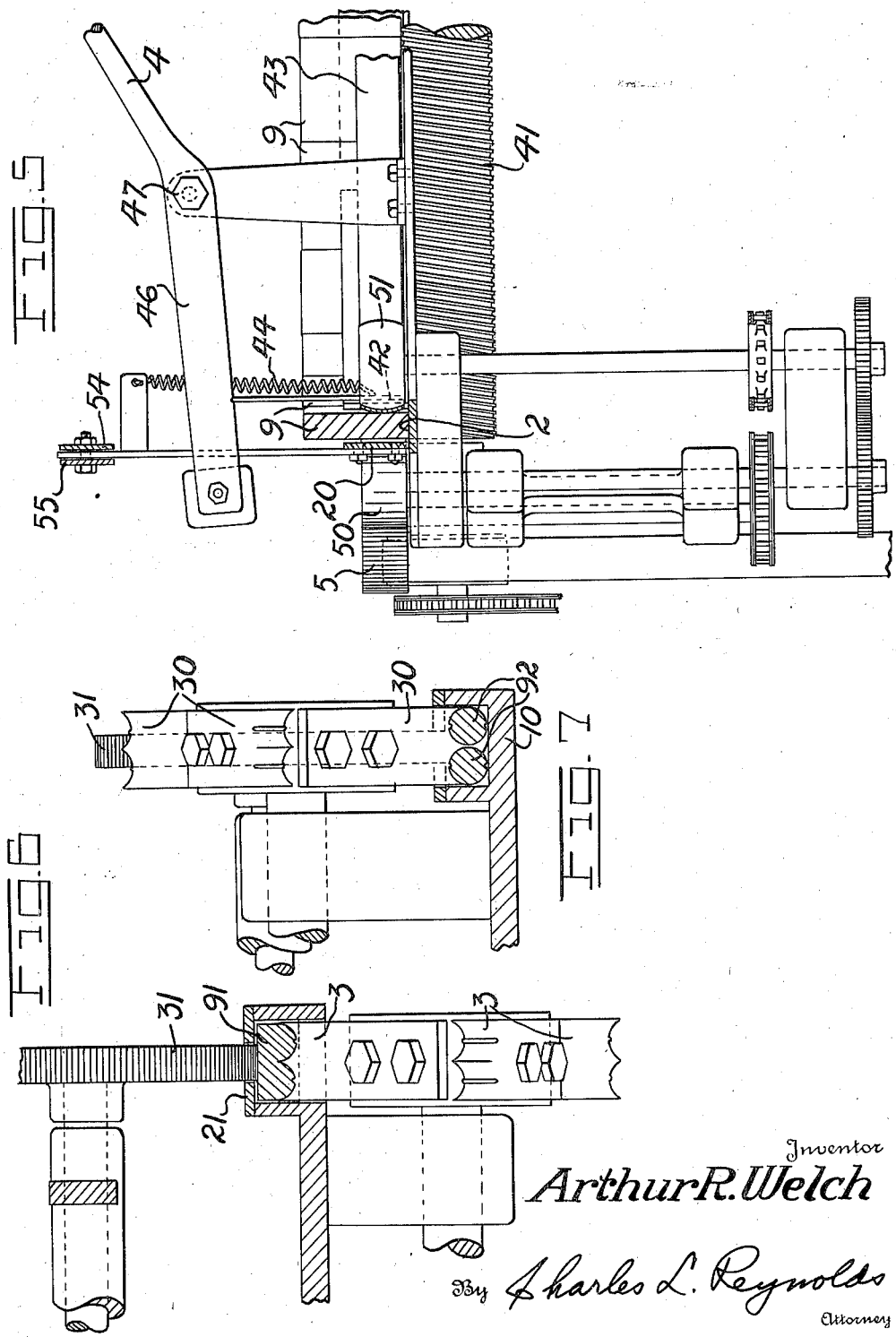

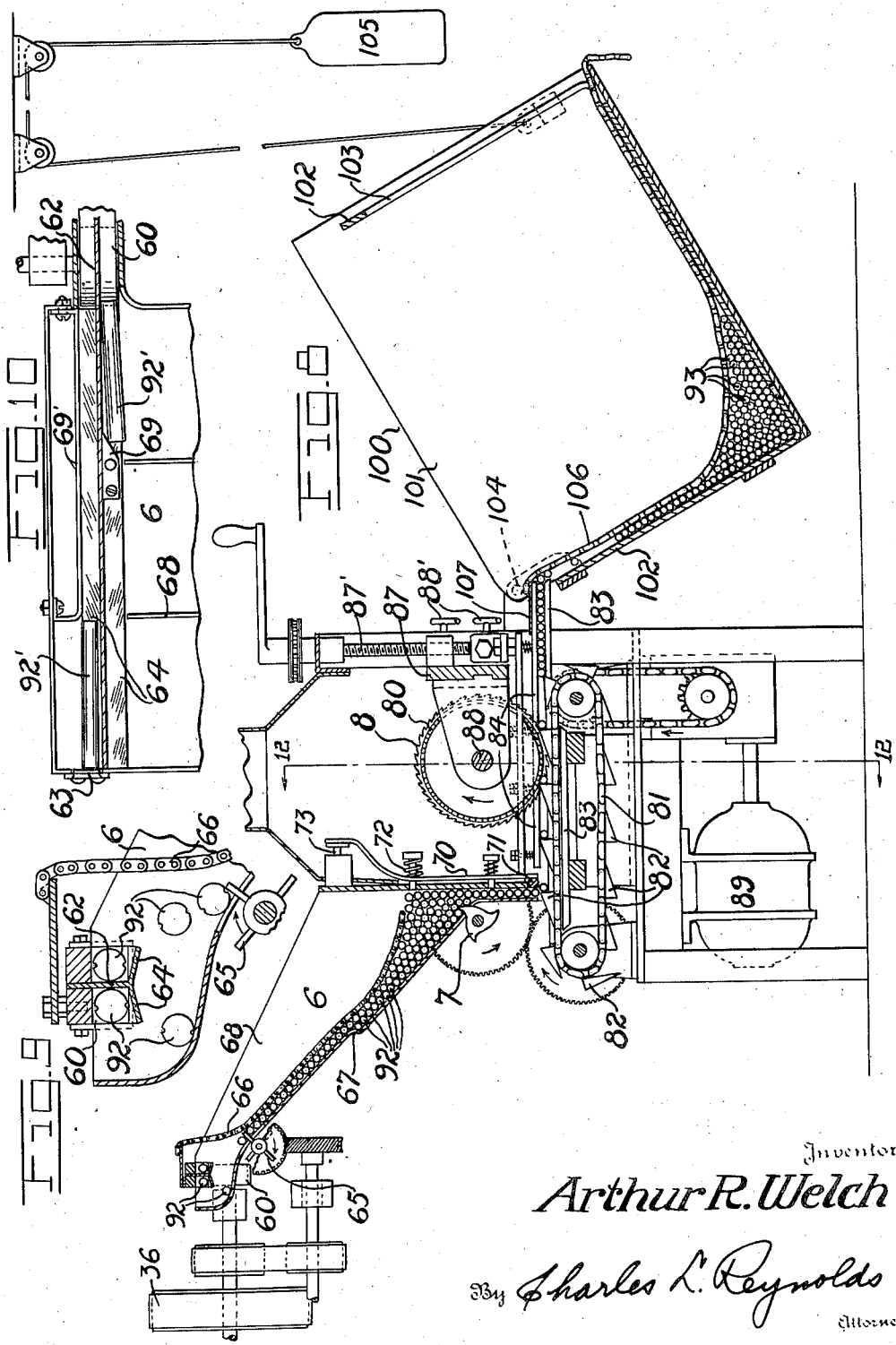

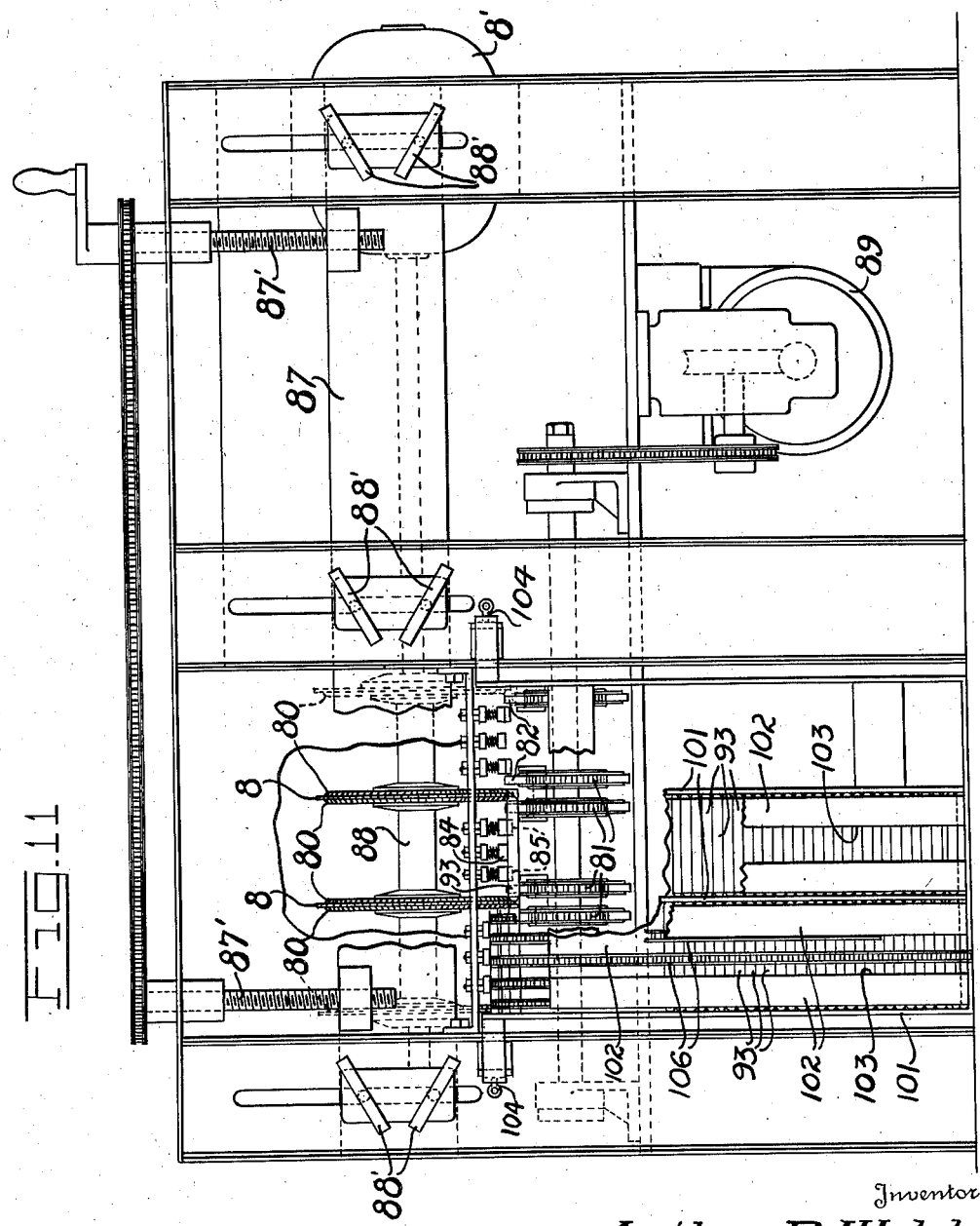

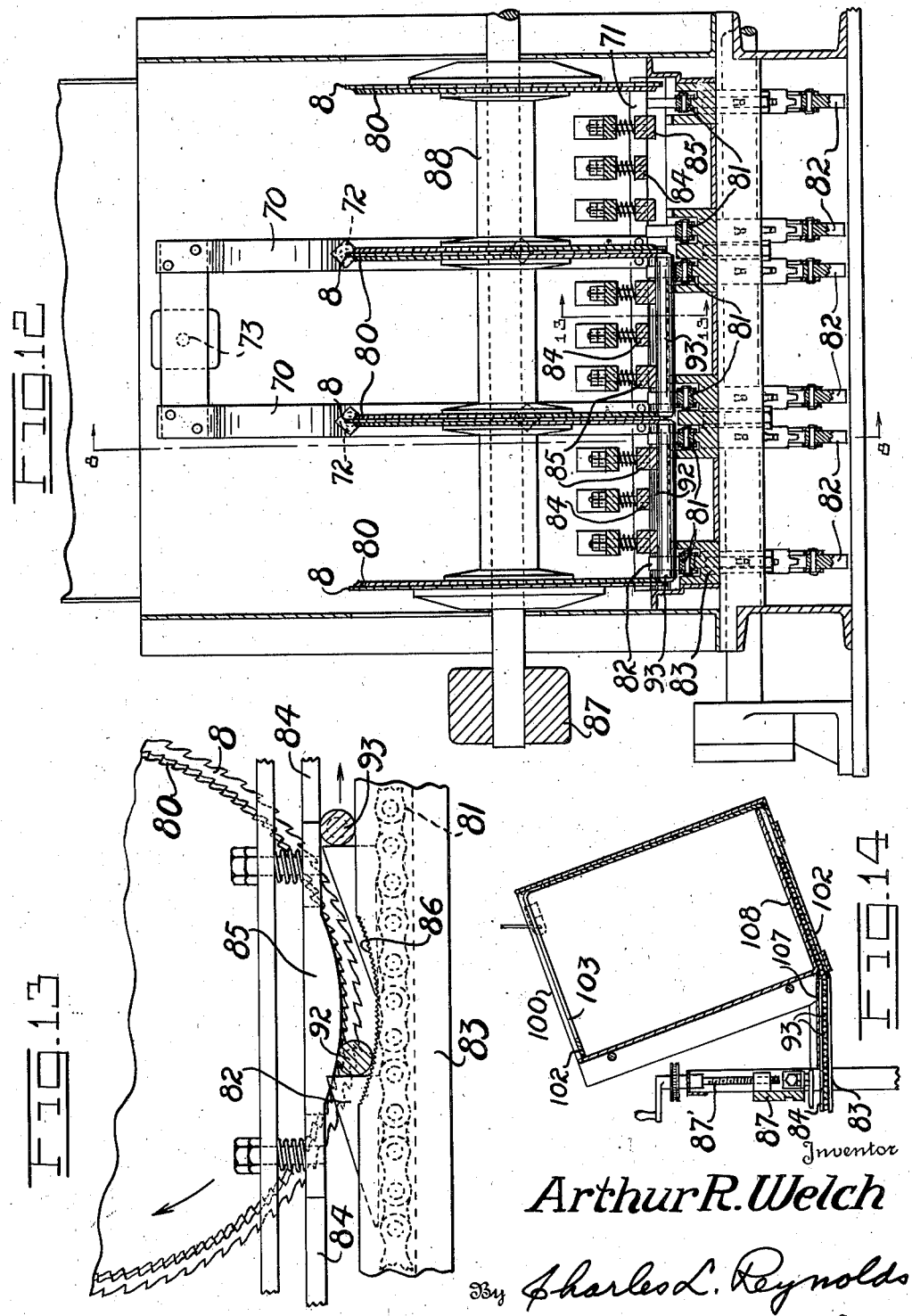

2,079,093

UNITED STATES PATENT OFFICE 2,079,093

DOWEL MAKING MACHINE

Arthur R. Welch, Hoquiam, Wash., assignor to Harbor Plywood Corporation, Hoquiam, Wash., a corporation of Delaware Application August 26, 1933, Serial No. 686,953

6 Claims. (Cl. 144—3)

My invention relates to machines for the manufacture of dowels such as are employed in the manufacture of doors, furniture, and the like.

In the manufacture of doors the amount of lumber used in the dowels will average in the neighborhood of eighteen per cent of the entire amount of lumber required. There results in the manufacture of doors a considerable quantity of short lengths from the rails and stiles, and since no means has been known for the economical employment of these short lengths in door manufacture (the dowels being made in sticker machines from long lengths of special lumber), these short lengths have constituted a source of considerable loss. It is the broad object of my invention, then, to devise means whereby excellent dowels may be manufactured from these short lengths, thus effecting a saving in the short lengths and an additional saving in avoiding the necessity of cutting up lumber for the sole purpose of making dowels.

In general I propose a machine which may be completely automatic to accomplish the following ends. Short lengths of wood suitable for the formation of dowels, which I term blocks, are fed at the proper time into the machine to be advanced to and past a blank-forming device such as a saw, where blanks are severed from the blocks, lengthwise of the latter, of a thickness and width to form one or more dowel sticks of length equal to the length of the original blocks. The remainder of the block is carried around again to the blank-forming device for repeated cuts, and the blanks as formed are advanced to and past a sticker, in which the dowel sticks are formed from the blanks. These sticks might be employed as dowels, but preferably they are trimmed to a given length and the ends are chamfered, and to this end I provide means for receiving the dowel sticks and piling them, and for feeding them one at a time past cut-off or end-trimming and chamfering devices, such as saws, in the course of engagement with which the dowel sticks are rotated to present all sides to the cut-off and chamfering saws. They are then discharged into suitable receiving devices, and there piled in parallel relationship, ready to be inspected and removed to the machines in which the dowels are employed and inserted into door parts. If the dowel sticks are of a length exceeding that necessary for two or more dowels, the end-trimming and chamfering devices may cut each dowel stick simultaneously into a plurality of dowels, and at the same time finish the ends of these dowels, and in such instances it is preferable that the individual dowels be received and piled in separate receivers. The blocks may be of such thickness that the blanks cut therefrom will be of a width sufficient to form two or more dowels, and these dowels may be formed simultaneously from a single blank in the sticker, and when discharged into the original receiving and piling hopper they may be all mingled indiscriminately, or may be kept separate if there is any reason to do so. The entire operation may be automatic except for the feeding at suitable intervals of a fresh supply of blocks, and the final inspection and removal of the receivers full of completed dowels.

In this specification the wood which is originally fed into the machine may be appropriately termed blocks. The first cut from these blocks may be designated blanks, since these are the pieces from which the dowel sticks are formed, and the sticks, after the blank has passed through the sticker, may be termed dowel sticks, though sometimes herein referred to as dowels, for while they may be used as dowels it is preferable that further operations be performed upon them to complete them as dowels, hence the final product only is usually termed a dowel.

It is a further object of this invention to radically revise the method and the machinery for manufacturing dowels by forming such dowels by the movement of dowel sticks, previously formed, transversely of their length, and the simultaneous trimming and—if desired—chamfering of the ends of the dowels, thus simultaneously manufacturing a plurality of dowels from a single dowel stick.

It is a further object to provide means for receiving and piling such dowels, which is also applicable to the receiving and piling of dowel sticks, which will enable them to be neatly piled and packed within suitable hoppers or containers, in which they will all lie parallel and even, greatly facilitating feeding singly from hoppers, and inspection and handling of the same.

It is a further object to make such a machine which is adaptable by simple adjustments to the manufacture of dowels of different lengths, and to the manufacture of dowels or dowel sticks from blanks of approximately the same length as the completed dowels or sticks, or alternatively, of a length somewhat in excess of the aggregate length of a plurality of such dowels or sticks.

It is a further object to provide automatic feeding means which will move a plurality of short blocks past a cut-off means, at which point the blanks are severed from the blocks, repeatedly passing the blocks past the cut-off or blank-forming means until the blocks are used up to an extent that they will not form proper dowels. Associated with this object is the provision of automatic discharge means for the remainder of the blocks when they have been used up to the extent that there cannot be formed from the remainder a suitable dowel or dowels.

Other objects, more especially such as pertain to the mechanical means for feeding, handling, advancing, blank-forming, stick-forming, and dowel-forming and handling means, and to safety means employed, will be better understood as this specification progresses.

My invention comprises the novel machine, and the novel parts thereof, and combinations of parts, all as shown in the accompanying drawings, described in this specification, and as will be more particularly pointed out by the claims which terminate the same.

In the accompanying drawings I have shown my invention embodied in a typical machine, though it will be evident that the form and the parts thereof may be altered, and I do not desire to be limited by reference to the description of the specific machine which follows except as required by the claims.

Figure 1 is a general plan view of the complete machine.

Figure 2 is a somewhat enlarged plan view of the feed mechanism and the blank-forming portion of the machine, and Figure 3 is an elevation of the same, parts being shown in section on the line 3—3 of Figure 1.

Figure 4 is a detail sectional view on a vertical plane through a part of the block-feeding and blank-forming device and through the sticker associated therewith.

Figure 5 is a transverse sectional view through the primary feed devices.

Figure 6 is a transverse sectional view of a detail of the sticker, and Figure 7 is a similar view, the two showing the step of forming two dowel sticks from a single blank.

Figure 8 is a transverse vertical sectional view on the line 8—8 of Figure 12, through the dowel forming end of the machine, illustrating also the receiving and piling means.

Figure 9 is an enlarged sectional view of the primary dowel stick receiving and piling device.

Figure 10 is an illustration in plan of the dowel stick receiving and directing mechanism, arranged for the receiving and piling, and normally for the subsequent forming, of dowels from blocks of approximately the length of the dowels to be formed.

Figure 11 is an elevation of the dowel-forming mechanism, looking from the delivery end, and with parts broken away to show the interior mechanism.

Figure 12 is a sectional view on the line 12—12 of Figure 8, through the dowel-forming devices.

Figure 13 is an enlarged detail elevation, taken at right angles to Figure 12, of the dowel-forming mechanism.

Figure 14 is a detail in section of a modified form of receiving and piling device.

General assembly

Referring to Figure 1, the machine may be conveniently divided for descriptive purposes into several parts, as follows. The primary block-feeding mechanism is shown at A. This is arranged for manual control. The blocks are passed thence to the blank forming device at B, and the remainder of the blocks, after blanks have been cut therefrom, are carried back along an endless path upon a device which is aptly termed a race track and illustrated at C, to the cut-off mechanism at B. The blanks continue from the cut-off mechanism B to a sticker D, where the dowel sticks are formed from the blanks, and are then delivered to the primary piling mechanism at E. From this point individual sticks are fed to the dowel-forming mechanism at F, whence they are delivered to suitable piling and receiving devices at G, ready for inspection and removal.

Various drive means have been illustrated in the drawings, but it will be evident that the form and arrangement of these may be varied materially, hence while they will be described in detail it should be borne in mind that such detail description is purely to aid in clearly understanding the operation of the machine, and is not to be construed as limiting the machine to construction and to drive in the manner described.

The blank-forming mechanism

It is convenient to start the detail description of the machine with the blank-forming device B, which may consist essentially of a saw 1 mounted to rotate in a horizonal plane, and a means to guide the blocks to the saw. The guide means are, in effect, the conveying table 2 forming part of the race track C, together with its guide rail 20, and a separator plate 21 which is spaced above the table 2 by an amount corresponding to the spacing from the latter of the saw 1. In other words, the separator 21 lies in the same plane as the saw and close behind the latter to receive the remainder of the block after the blank has been cut therefrom by the saw. The separator is a part of the race track C. The operation of the blank-forming saw is best understood by noting that the blanks, standing on edge, are caused to move continuously in endwise fashion about the race track C to be presented in turn to the blank-forming saw 1, which makes a cut from the lower portion of the block, the remainder continuing to circulate around the race track, and the blanks being carried along a table 10 beneath the separator 21, this table 10 forming a continuation of the table 2, but leading the blanks to the sticker at D.

Any suitable drive may be employed for the saw 1; as shown herein, a separate motor 11 is provided (see Figure 3). Likewise, as is customary in wood handling machines, presser rolls would ordinarily be employed to advance the blanks, such a roll being illustrated at 12.

The sticker

There is illustrated at D a conventional sticker. Ordinarily it is not considered feasible to advance short lengths such as this through a sticker since they must be fed in at one end and pulled through at the opposite or discharge end. It must be remembered, however, that the blanks are positively fed forward by pressure from the blocks circulating in the race track, and each pressing forward against the block ahead, and the same pressure is maintained on the blanks after their severance from a block.

The form of the sticker is immaterial; it may be anything which is found suitable, and as shown, it consists of a lower cutter head 3, an upper cutter head 30, and suitable hold-down rolls 31, together with guides, whereof the lower guide is formed by the extension of the table 10, and the upper guide by an extension of the separator 21.

As in the case of the blank-forming saw, the drive for these elements may be anything found suitable, and is illustrated herein as consisting of a motor or motors 32 connected by belts 33 and 34 to the respective cutter heads. A belt 35 from a motor 22 furnishes power for the combined hold-down and feed rollers 31.

*The feed devices*

The primary feed device A and associated parts can be best understood by reference to Figures 1 to 5 inclusive. A block supply table 40 extends across the race track C and on a level with its conveying table 2. On it are placed the blocks 9, on edge and face to face. Helically grooved rollers 41 are journaled beneath the block supply table 40, projecting slightly thereabove to engage the blocks 9, and these rollers 41 are rotating continuously to urge the blocks towards a gate 42 which is normally maintained closed, parallel to the backstop or guide rail 20 and spaced therefrom by about the thickness of a block. The action of the rollers in urging the blocks forward is assisted by a belt 43 continuously moving and engaging one end of the blocks, to insure the immediate advance of this end as soon as the gate is removed.

The gate 42 is acted upon by a tensioned spring 44 which tends to raise it into the position shown in Figure 3 to permit the blocks 9 to advance into contact with the backstop 20, where they are engaged by feed devices, to be described hereafter, and advanced endwise along the race track. The gate is prevented from rising and swinging about its pivot 45 by engagement therewith of a weighted arm 46 pivoted at 47 to swing in a plane at an angle to the plane of swing of the gate. The arm 46 is part of a control lever 4 which when raised by the attendant, releases the gate to the spring 44, whereupon it snaps up out of the way, and permits the blocks to be fed forward under the action of the rolls 41 and belt 43. When all the blocks 9 are fed into the race track the attendant swings the gate downward and permits the weighted arm 46 to drop again upon it, to hold it in this position.

Immediately the blocks enter the race track they are engaged by the feed rollers 5 and 50, and with the belt 43 as it bends around the pulley 51, to advance them along the race track towards the blank-forming saw at B. They may be also engaged from above by hold-down rollers 52 and 53 independently supported upon the respective weighted arms 54 and 55, unless these are held raised by the arm 46, beneath them, and immediately thereafter the blocks are engaged by the pairs of feed rollers 56 and 57, by the last of which it is delivered to and pushed past the saw 1. These positively operating feed means push the blocks ahead by pressure from the blocks behind, and these same feed means, assisted by a pair of feed rollers 58 at the opposite side of the race track or as many other feed means as may be found necessary, cause the blocks to move round and round the race track 2 to be presented repeatedly to the cutoff saw at 1. A guide rail 23 along the straightaway opposite the feed side of the race track prevents buckling of the blocks, and they naturally buckle outwardly on the turns.

There would ordinarily be a sufficient number of blocks placed on the feed table 40, each of reasonably accurate length, to precisely fill the race track, and no more, and the last of these is fed in as the first of the particular group being fed reaches the gate on the return passage about the race track. The gate 41 is then closed, and the blocks continue to circle automatically. Meanwhile the attendant is preparing and placing on the feed table a new set of blocks, preparatory to feeding them into the machine.

It will be evident that by repeated cuts from the blocks they will eventually reach a height where there is not sufficient material left from which to form proper dowels. I have therefore provided on one of the turns of the race track an aperture 24 in the guide rail or backstop 20 (see Figures 2 and 3) through which these waste pieces 90 will pass. The height of this aperture is such as to permit blocks of less height than is required to make a proper dowel to pass through, but the aperture is low enough that it will not permit to pass pieces which have sufficient height to make good dowels. When the procession of blocks, depleted to the point where they will not form a proper dowel, reaches the aperture 24, they are promptly and automatically discharged and may be dropped into a suitable receptacle R (Figures 2 and 3), and by this time the attendant has a fresh supply of blocks ready, and he immediately raises the gate and starts feeding them into the machine. It will be noted that the hold-down rollers 52 and 53 are spaced by about the thickness of a block, hence the roller 53 may still hold down the last of the depleted blocks on its way to the saw 1, and the other roller 52 may rise and ride over the first of the fresh supply of blocks, which immediately thereafter will raise the roller 53 after the last of the depleted blocks has been seized by the feed rollers 57.

The drive means for the feed devices described may be any which is found suitable. I have shown the motor 22, previously referred to, connected to these various feed devices by suitable chains, belts, gears, and the like, as shown in detail in the drawings, and it does not seem necessary to refer to them in detail in this specification.

*The primary receiving and piling device*

The dowel sticks, after being formed by the sticker D, are shot forward endwise at a considerable rate of speed under the influence of a high speed feed belt 60, driven by the belt 36, to which they have been advanced by the pressure of following dowel sticks, pushed on in turn by the blanks. To prevent buckling in their passage to the belt 60, the dowels are retained in a covered channel 61, and preferably the individual dowel sticks are separated by a plate 62 (see Figures 1, 9, and 10). They are discharged into the upper end of a hopper 6, and by reason of the speed of their advance they clear the following dowel sticks, and drop. They may be caused to strike a resilient end plate 63, whereupon they fall, as shown, upon opposite sides of the partition plate 62, being assisted by the now sloping support 64.

Dropping upon the inclined bottom of the hopper they roll down and are promptly engaged by a series of rotating pins 65 which urge them downward, and which tend, in a measure, to cause them to lie parallel. However, to insure that they will straighten out and lie in parallel alignment, a series of chains 66 are suspended from above the point of entry of the dowel sticks 92, creating a resistance against which the rotating pins 65 may act, thereby causing all the dowel sticks to eventually lie parallel within the hopper 6. The bottom of the hopper is broken at 67 so that the dowel sticks will not form one flat sheet of parallel sticks, but will pile up in the bottom of the hopper. The chains 66 are preferably of varying lengths to supply a graduated drag to the hoppers, the minimum necessary to retain them in parallelism throughout the extent of their movement down the hopper. Ordinary bicycle chain has proven very satisfactory for the purpose.

For a purpose which will presently appear, the hopper is preferably divided by partitions 68 into a plurality of chambers, so that the hopper can receive dowel sticks of a length equal to the entire width of the hopper, of a length equal to two-thirds the width of the hopper, or of a length equal to one-third of the hopper, in which latter case two chambers may be simultaneously filled, one by the dowel sticks from one side of the partition 62, and the other by dowel sticks from the opposite side of that partition.

To attain the latter result a switching arrangement, best shown in Figure 10, may be employed, this being so arranged that it can be removed, and the partitions 68 being likewise removably positioned within the hopper, whereby ready adjustment of the machine to the length of blocks being employed is possible.

Referring to Figure 10, there is seen an angled switch piece 69 supported upon the inclined shelf 64 at one side of the partition 62, and a backstop 69', spaced from the partition 62 at the opposite side thereof, insures that the dowel sticks at this side will travel the full width of the hopper, to be discharged into the most distant chamber thereof. The switch piece 69, however, may be positioned to cause the short dowel sticks to be discharged into the nearest or into the intermediate chamber of the hopper, as may be desired. The members 69 and 69' are secured by easily removable means, such as the bolts illustrated in Figure 10, and when they are not in place the two dowel sticks will travel to the distant side of the hopper from the point at which they enter it.

*The dowel-forming mechanism*

Ordinarily the machine is so operated as to maintain a reasonable number of dowel sticks in the hopper 6, and at its lowest point these drop singly into a downwardly directed channel between the down-curved bottom of the hopper and the front wall thereof, as is best seen in Figure 8. Any tendency to jam is prevented by the jigger 7. Should a jam occur, however, especially at the point of picking up the individual dowel sticks by the feed portion of the dowel-forming mechanism, to be described, a yieldable bar 71 mounted on arms 70, backed by springs 72, effects the depression of a stop button 73 controlling the motor 8' which drives the dowel-forming device, thus stopping the latter.

Essentially the dowel-forming device consists of a series of saws 8 and 80 (see Figures 8, 11, 12, and 13), the former constituting cut-off saws and the latter being beveled for chamfering the ends of the dowels. These saws are spaced along an arbor 88, extending parallel to the length of the dowel sticks and transversely of the path of movement of the latter in passing from the hopper 6.

Such movement of the dowel sticks, one by one, may be effected by suitable means such as the chain conveyor 81 carrying the dogs 82, the upper run of which is supported in grooves in a table 83 (see Figures 12 and 13). The dowel sticks are held down by yieldable presser bars 84 disposed lengthwise of their direction of movement and intermediate of the several sets of saws 8 and 80.

As the dowel sticks 92 or 92' are moved by the conveyor 81 past the rotating saws 8 and 80 the dowel sticks are trimmed to lengths by the saws 80, and if they are a multiple of the length of the dowel required, they are cut by these saws 80 into the proper lengths, and simultaneously the beveled chamfering saws 80 chamfer the ends of the dowels 93 thus formed. During their passage of the saws and of their engagement thereby, the dowel sticks are held down by special presser bars 85, curved similarly to the saws, into engagement with teeth 86 formed on a like curve of the table 83 (see Figure 13), and this engagement with the teeth 86 causes them to roll to present all sides thereof to the chamfering saws 80. The completed dowels are then pushed on by the pressure of those behind to be discharged into the final receiving and piling devices at G.

Suitable adjustment of the frame 87 carrying the saw arbor 88 is accomplished by means of jack screws 87', the frame 87 being, however, locked in any given adjusted position by the clamping screws 88'.

The jigger 7 and the conveyor 81 are suitably driven, as shown being driven from the motor 89, and the saw arbor 88 is preferably driven from a separate motor 8'.

*Final receiving and aligning devices*

The completed dowels, discharged from the dowel-forming mechanism just described, drop from the table 83 into a hopper, generally designated by the numeral 100, and capable of being divided by partitions 101, corresponding in position with the partitions 68 in the primary piling and receiving device E. In these hoppers 100, which are preferably skeleton-like, I support U-shaped frames 102, as may be seen in Figure 8, one side of which is preferably slit and cut out to leave the aperture 103 (see Figures 1, 8, and 11). The hopper 100 as a unit is preferably pivotally supported from the frame of the dowel forming device at the point 104, and the position thereof may be controlled by a connected counterweight 105. Chains 106, similar to the chains 66, are supported above the point of discharge of the dowels into the hopper 100, preferably upon a removable plate 107, and these chains overlie the dowel sticks as they drop into the hopper 100, and cause them to straighten out and lie parallel. The chains are preferably of graduated length and symmetrically arranged in each of the individual chambers of this hopper. The attendant at the discharge end of the machine may occasionally alter the angular position of the hopper about its pivot 104, and may adjust the chains 106 to supply the requisite amount of resistance and drag upon the dowels 93.

An alternative arrangement to the same end is shown in Figure 14, wherein the completed dowels are forced beneath a plate 108 of some weight, causing it to rise in the hopper 100 as the dowels are forced into the hopper beneath this plate. The resistance thus effected causes the dowels to remain parallel and to lie straight.

When the U-shaped frame 102 is substantially filled the dowel-forming and feeding device is stopped momentarily, the frame 102 is removed by sliding it endwise from the hopper 100, and the dowels are inspected for splintered or imperfect ends, the chief cause of rejection. Imperfect dowels can be poked out of the pile and removed, and the remainder suitably packed ready for use in the manufacture of doors, furniture and the like.

Safe guards

The safety stop 73 has already been noted, and similar safe guards or manually operated stop devices may be employed at suitable points in the machine, as may be found necessary or desirable. The feed devices for the blocks, for the blank-forming device at B, and for the sticker at D are preferably under the control of the feed operator, while the discharge operator preferably has control of the dowel-forming device at F. Since such devices are common it has not been thought necessary to show or describe them. Also it is common practice to surround saws, cutter heads, and the like with suitable guards, and to provide hoods and conduits for the removal of sawdust, chips and the like, and while in some instances these are shown, in other instances they have been omitted for clearer illustration, but it is to be understood that such safeguards as are necessary or required about such machines will be employed.

Conclusion

The operation of the machine has been made clear through the successive steps, and it is believed that no detailed statement of the complete operation is necessary at this point. The blocks 9 are fed into the machine at suitable intervals, the blocks are carried round and round the race track, and meanwhile the blanks 91 are removed therefrom by the saw 1 and passed to the sticker at D. From these blanks are formed the dowel sticks 92 or 92' which are passed into the primary receiving and piling device at E, and fed therefrom by lateral transfer means to the dowel-forming mechanism at F. In the latter device they are cut to length and the ends chamfered, whereupon they are discharged into the final piling and aligning device at G.

It will become readily apparent that the forms of the various parts may be changed, and their relative positions may be altered considerably, within the scope of the invention as defined by the claims, and the description, while given in detail, is not to be construed as limiting the invention to the precise form described, since the detailed description has been given for the purpose of aiding a clear understanding of, and in illustration of, the principles of the invention.

What I claim as my invention is:

1. In a dowel making machine, in combination, a conveying table and a cooperating guide rail constituting a closed path, a block supply table disposed transversely of the conveying table at one side, whereon to dispose a plurality of blocks on edge, in face to face relationship, a pivoted gate to prevent feeding of such blocks into the closed path, a spring continuously urging said gate out of such position, and a weighted lever swinging in a plane at an angle to the plane of swing of the gate, normally holding said gate in the position described, against the action of said spring, and movable to release the gate for quick opening, to feed in the blocks, and means to advance the blocks about such closed path.

2. In a dowel making machine, a sticker to form a plurality of dowel sticks simultaneously from one blank, means to project said sticks rapidly from the discharge end of the sticker, bumper means to arrest said sticks and to substantially align the bumped ends, said guide means being open at opposite sides for the delivery of said sticks when arrested, and hopper means to receive the sticks.

3. In a dowel making machine, in combination, a block conveying table and a guide rail constituting a closed path, means to advance blocks in such path, a block supply table adjacent to such path for storing blocks on edge, means continuously impelling blocks toward the closed path for feeding thereinto, and means normally interdicting feeding movement of the blocks under the influence of said impelling means, and movable at will to noninterdicting position.

4. In a dowel making machine, in combination, a block conveying table and a guide rail constituting a closed path, means to advance blocks in such path, a block supply table adjacent to such path for storing blocks on edge, means continuously impelling blocks toward the closed path for feeding thereinto, a gate normally interdicting feeding movement of the blocks under the influence of said impelling means, means urging said gate away from interdicting position, and a catch to hold said gate in interdicting position, releasable at will to permit instantaneous movement of said gate to noninterdicting position under the influence of said urging means, for immediate feeding of blocks to the closed path by said impelling means.

5. In a dowel making machine, in combination, a block conveying table and a guide rail constituting a closed path, means to advance blocks in such path, a block supply table adjacent to such path for storing blocks on edge, means continuously impelling blocks toward the closed path for feeding thereinto, means normally interdicting feeding movement of the blocks under the influence of said impelling means, and movable at will to noninterdicting position, and an upright belt moving transversely across one end of the stored blocks to align the blocks at such end, and to move the belt-contacted ends of the blocks quickly into the closed path upon movement of said interdicting means to noninterdicting position.

6. In a dowel making machine, in combination, a block conveying table and a guide rail constituting a closed path, means to advance blocks in such path, a block supply table adjacent to such path for storing blocks on edge, a continuously rotating feed screw impelling blocks on said supply table bodily toward the closed path for feeding thereinto, means normally interdicting feeding movement of the blocks under the influence of said screw and movable at will to noninterdicting position, and an upright belt moving transversely across one end of the stored blocks at a rate to effect movement of the belt-contacted block ends faster than the bodily movement occasioned by said feed screw, toward the closed path, upon movement of said interdicting means to noninterdicting position.

ARTHUR R. WELCH.